US012344046B2

(12) United States Patent
Gil (10) Patent No.: US 12,344,046 B2
(45) Date of Patent: Jul. 1, 2025

(54) MOBILE CARBON CAPTURE SYSTEM ENHANCEMENT

(71) Applicant: UNITED PARCEL SERVICE OF AMERICA, INC., Atlanta, GA (US)

(72) Inventor: Julio Gil, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 85 days.

(21) Appl. No.: 18/176,979

(22) Filed: Mar. 1, 2023

(65) Prior Publication Data

US 2024/0294041 A1    Sep. 5, 2024

(51) Int. Cl.
| | |
|---|---|
| B60C 23/00 | (2006.01) |
| B60C 5/00 | (2006.01) |
| B60C 23/10 | (2006.01) |
| F01N 3/08 | (2006.01) |
| F01N 9/00 | (2006.01) |

(52) U.S. Cl.
CPC ............ B60C 23/002 (2013.01); B60C 5/001 (2013.01); B60C 23/10 (2013.01); F01N 3/08 (2013.01); F01N 9/00 (2013.01); B60C 2200/04 (2013.01); F01N 2240/26 (2013.01); F01N 2570/10 (2013.01); F01N 2900/1406 (2013.01); F01N 2900/1411 (2013.01)

(58) Field of Classification Search
CPC ....... B60C 23/002; B60C 5/001; B60C 23/10; B60C 2200/04; F01N 3/08; F01N 9/00; F01N 2240/26; F01N 2570/10; F01N 2900/1406; F01N 2900/1411
See application file for complete search history.

(56) References Cited

U.S. PATENT DOCUMENTS

| | | | |
|---|---|---|---|
| 2005/0279160 A1* | 12/2005 | Nordhoff | B60C 5/22 73/146 |
| 2017/0043623 A1* | 2/2017 | Bowman | B60C 23/004 |
| 2020/0040790 A1* | 2/2020 | Hudson | F01N 3/0821 |
| 2022/0282651 A1* | 9/2022 | Reynolds | B01D 53/047 |
| 2024/0060438 A1* | 2/2024 | Conway | F01N 3/0857 |

* cited by examiner

Primary Examiner — Brandon D Lee
(74) Attorney, Agent, or Firm — Shook, Hardy & Bacon (57) ABSTRACT

The technology disclosed herein relates to a system for the efficient capture and storage of carbon dioxide from a vehicle's exhaust while in transit. The system includes an apparatus for extracting the carbon dioxide from an exhaust gas and passing it to a compressor or carbon dioxide management system. The system then compresses the carbon dioxide and determines if a tire has capacity for the carbon dioxide. The tire has a carbon dioxide chamber and an external air chamber. If the carbon dioxide air chamber has capacity, the compressor will supply compressed carbon dioxide into the carbon dioxide chamber. Upon arrival at an external storage location, the carbon dioxide stored in the tires are able to be extracted and supplied to the external storage location.

19 Claims, 7 Drawing Sheets

MOBILE CARBON CAPTURE SYSTEM ENHANCEMENT

BACKGROUND

Current delivery vehicles rely on fossil fuel powered engines which produce large volumes of carbon dioxide as a by-product. Carbon dioxide is known to be harmful to the environment and mitigation strategies are being developed for remediation and capture of carbon dioxide emissions. However, there remain unsolved problems with vehicle carbon dioxide capture and storage.

SUMMARY

At a high level, aspects described herein relate to a system designed to capture and store carbon dioxide from a vehicle's exhaust while the vehicle is in transit. The system comprises a carbon dioxide capture apparatus that allows for the extraction of carbon dioxide emissions from the exhaust of a vehicle. The carbon dioxide captured by the apparatus needs to be stored in a location on the vehicle before it is able to be transferred into an off-vehicle location. As such, the system provides for at least two storage options. A first storage option relies on storage tanks housed on the vehicle such that the captured carbon dioxide can be stored therein. The captured carbon dioxide is pressurized and transferred into storage tanks. A second storage option relies on a system that transfers the captured carbon dioxide into the vehicles tires, which displaces the air. This may be accomplished using one or more chambers that are directly connected to the carbon dioxide capture system and one or more chambers that are filled with external air. The system would detect the availability of the carbon dioxide chambers to accept additional carbon dioxide. The system would then fill the chamber with captured carbon dioxide and displace the air filled chamber.

In some aspects, a system to facilitate a storage of carbon dioxide extracted from a vehicle in transit is provided. The system may comprise in part a carbon dioxide capture apparatus. The carbon dioxide capture apparatus comprises components configured to capture carbon dioxide from an exhaust system for an engine on the vehicle. The system also comprises a carbon dioxide compressor linked to the carbon dioxide capture apparatus by a first air transfer line. Additionally, a tire is linked to the carbon dioxide compressor by a second transfer line, the tire having a first compartment and a second compartment.

In another aspect, the carbon dioxide capture apparatus captures carbon dioxide from an exhaust gas emitted from an engine associated with the vehicle. Also, the carbon dioxide compressor is operated using one or more processors. Further, the one or more processors are linked to one or more sensors that detect pressure and flow to the first chamber from the compressor. One or more processors are configured to determine, using a detected flow and a detected pressure, if a volume of carbon dioxide within the first chamber is below a threshold. The one or more processors described herein are configured to turn the compressor on based on the determination that the volume of carbon dioxide is below the threshold. Moreover, the tire has a first pressure and a first volume, the first volume being a combination of a first compartment volume and second compartment volume.

Still yet another aspect comprises a method for facilitating storage of captured carbon dioxide on a vehicle in transit. The method comprises determining that a first chamber within a first tire has capacity to accept carbon dioxide. It is determined that a second chamber within the first tire has capacity to discharge air contained in the second chamber. Also, based at least in part on the determination that the first chamber within the first tire has capacity to accept carbon dioxide, supply pressurized carbon dioxide at a first pressure to the first chamber until the first chamber does not have capacity. The air contained within the second chamber is allowed to be released until the first chamber is at full capacity.

Another aspect includes the first chamber being determined to have capacity based at least in part an available volume of the first chamber. The first chamber is further determined to have capacity based in part on a measured flow and a measured pressure of the carbon dioxide within the first chamber. The measured flow is determined by a flow valve located between a compressor and the tire. Pressurized carbon dioxide supplied is provide by a carbon sequestration system that captures carbon dioxide from an engine exhaust system. The method may also remove the carbon dioxide from the first compartment by pressurizing the second chamber and opening a release valve connected to the first chamber. Finally, the tire described herein has and a first volume, the first volume being a combination of a first compartment volume and second compartment volume.

Another aspect includes one or more non-transitory computer storage media having computer-executable instructions embodied thereon, that when executed by at least one processor, cause operations comprising determining that a first chamber within a first tire has capacity to accept carbon dioxide. It is determined that a second chamber within the first tire has capacity to discharge air contained in the second chamber. Also, based at least in part on the determination that the first chamber within the first tire has capacity to accept carbon dioxide, supply pressurized carbon dioxide at a first pressure to the first chamber until the first chamber does not have capacity. The air contained within the second chamber is allowed to be released until the first chamber is at full capacity.

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

Additional objects, advantages, and novel features of the technology will be set forth in part in the description that follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

The present disclosure provides for a system for facilitating the capture and storage of carbon dioxide from the exhaust of a fuel burning engine on a vehicle. The system has one or more components which allow the system to capture or extract carbon dioxide from the exhaust and store it within one or more tires. This apparatus allows for the efficient storage of carbon dioxide while the vehicle is away from a facility to dispose of it properly. When the vehicle arrives at a proper disposal facility, the carbon dioxide is able to be purged from the tires and sold or used in a variety of ways.

Among the challenges of the energy transition, reducing carbon dioxide emissions of the transportation sector is one of the most difficult. Electrification of vehicles is of course a good solution to replace fossil fuel for mobility. This path is however penalized by the density of the electricity storage in the batteries. Mobile Carbon Capture is considered a transitional technology. As a retrofit option, it will be most useful in the period while current internal combustion engine vehicles are replaced by other alternatives with lower emissions. The length of that period will be influenced by the constrained supply of EVs in adequate quantities. Carbon dioxide capture is an alternative, if one can capture with limited energy penalty, and convert captured carbon dioxide into fuels using renewable electricity. This however requires the efficient capture and storage of the carbon dioxide of engine exhaust while moving or in transit. The capture of carbon dioxide while in transit present several problems, one of which is the efficient storage of the captured carbon dioxide. Current methods require large and heavy storage tanks attached to the vehicles. Or alternatively, a higher energy usage to liquefy and compress the collected CO2 into high pressure storage. This takes up valuable space and adds weight, which reduces fuel efficiency of the vehicle. If storage of the carbon dioxide could be done in a more efficient way, costs could be reduced, which would make carbon dioxide capture a more viable option.

The technology described herein provides for an efficient and cost reducing system that allows for the storage of captured carbon dioxide. The system relies on storage already housed on vehicles. Such systems rely on the space within the tires of the vehicle. Vehicles rely on air pressure to keep tires inflated. Many tires have pressures of near 100 psi and volumes of 3.5 cubic feet of storage. Additionally, semi-trucks and trailers have as many as 18 tires to fill. As such, there is a potential to store significant amounts of captured carbon dioxide within the tires of the vehicle. The system described herein provides elements and components for storing carbon dioxide within tires while the vehicle is in transit. Components include compressors, valves, pressure lines, spindle air passages, and tires having two or more pressure compartments. These components allow the system to extract carbon dioxide from the vehicle's exhaust and store it in the tires until it can be disposed of at a facility.

In addition, words such as "a" and "an," unless otherwise indicated to the contrary, may also include the plural as well as the singular. Thus, for example, the constraint of "a feature" is satisfied where one or more features are present. As such, an element in the singular may refer to "one or more."

Further, the term "or" includes the conjunctive, the disjunctive, and both (a or b thus includes either a or b, as well as a and b).

Additionally, the term "some" may refer to "one or more."

The term "combination" (e.g., one or more combinations thereof) may refer to, for example, "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Additionally, "user device," as used herein, is a device that has the capability of using a wireless telecommunications network, and may also be referred to as a "computing device," "mobile device," "user equipment" (UE), or "wireless communication device." A user device, in some aspects, may take on a variety of forms, such as a PC, a laptop computer, a tablet, a mobile phone, a PDA, a server, an Internet of Things device, any other device capable of communicating with other devices (e.g., by transmitting or receiving a signal) using a wireless communication, or one or more combinations thereof. A user device may be, in an embodiment, similar to computing device described herein with respect to FIG. 1. A user device may also be, in another embodiment, similar to user device 700, described herein with respect to FIG. 7.

Figure 1:
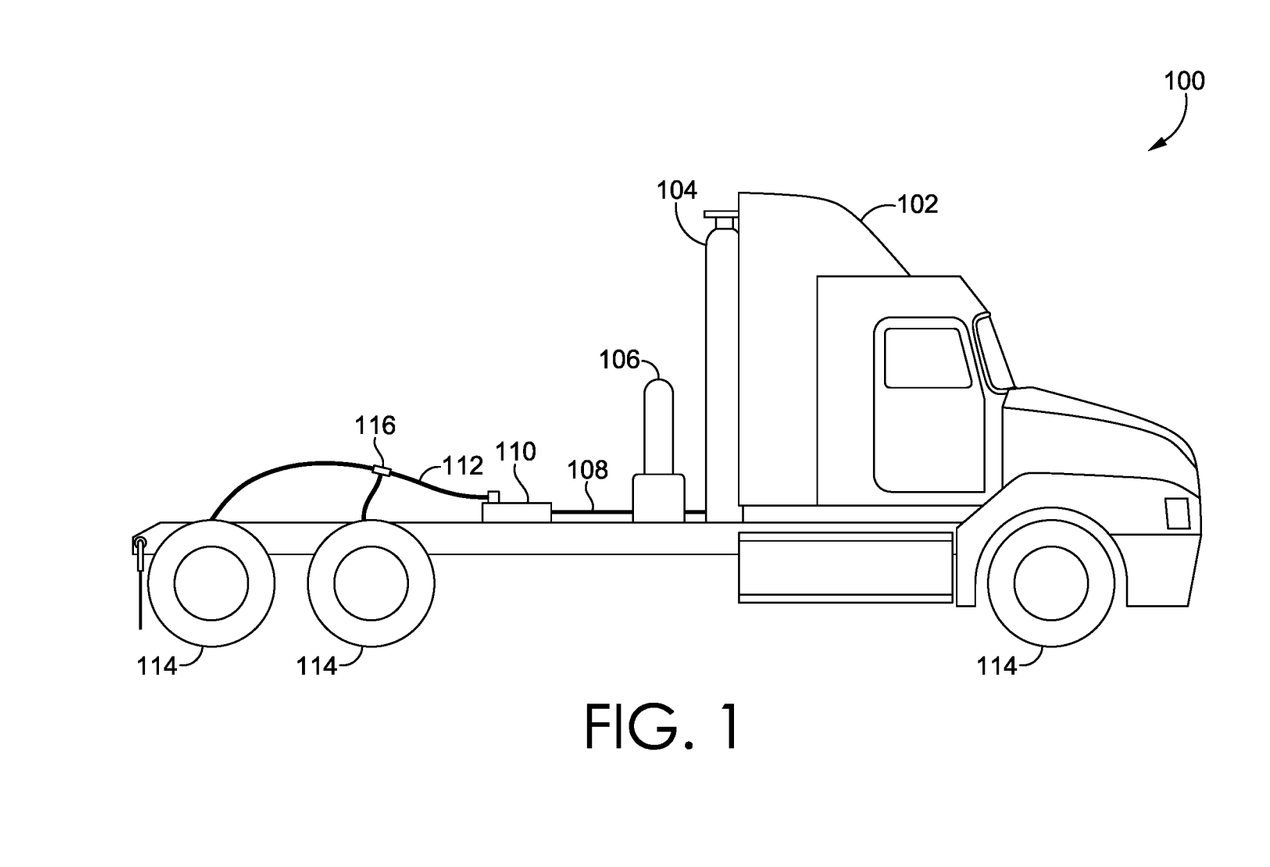
FIG. 1 is an example environment comprising a vehicle system, in accordance with aspects described herein.

FIG. 1 provides an example vehicle environment 100 that may be used containing the carbon capture and storage system. Example vehicle environment 100 comprises vehicle 102, carbon dioxide storage tank 104, carbon dioxide capture system 106, pressure transfer lines 108, carbon dioxide management system 110, pressurized lines 112, one or more valves 116, and a plurality of tires 114. The carbon dioxide management system 110 comprises a database, which includes tire data, vehicle data, and carbon dioxide capture data.

Example vehicle environment 100 is but one example of a suitable environment for facilitating capture and storage of exhaust-generated carbon dioxide, and is not intended to suggest any limitation as to the scope of use or functionality of aspects herein. Neither should the environment 100 be interpreted as having any dependency or requirement relating to any one or combination of components illustrated. As an example, the carbon dioxide management system 110 can also include a plurality of models (e.g., machine learning models) to learn instructions for facilitating the management of carbon dioxide capture and storage on a vehicle 102.

Components of example vehicle environment 100, such as carbon dioxide management system 110, can be devices either on the on-site or off site portion of example vehicle environment 100, or the carbon dioxide management system 110 may operate on a backend or in some instances a server side of example vehicle environment 100. Such user-side components may facilitate the completion of tasks and make a record of activities, such as inputting settings, changing component requirements, updating vehicle status, monitoring carbon dioxide capture and storage, monitoring carbon dioxide pressures, and so on. The carbon dioxide management system 110 backend component may comprise distributed software operating across user- and server-side, or server-side software designed to work in conjunction with user-side software on user-side devices, so as to implement any combination of the features and functionalities of the present technology. This division of vehicle environment 100 is illustrated to be one example of a suitable environment, and there is no requirement for each implementation that any combination of carbon dioxide management system 110 and user-side devices exist as separate entities.

Figure 7:
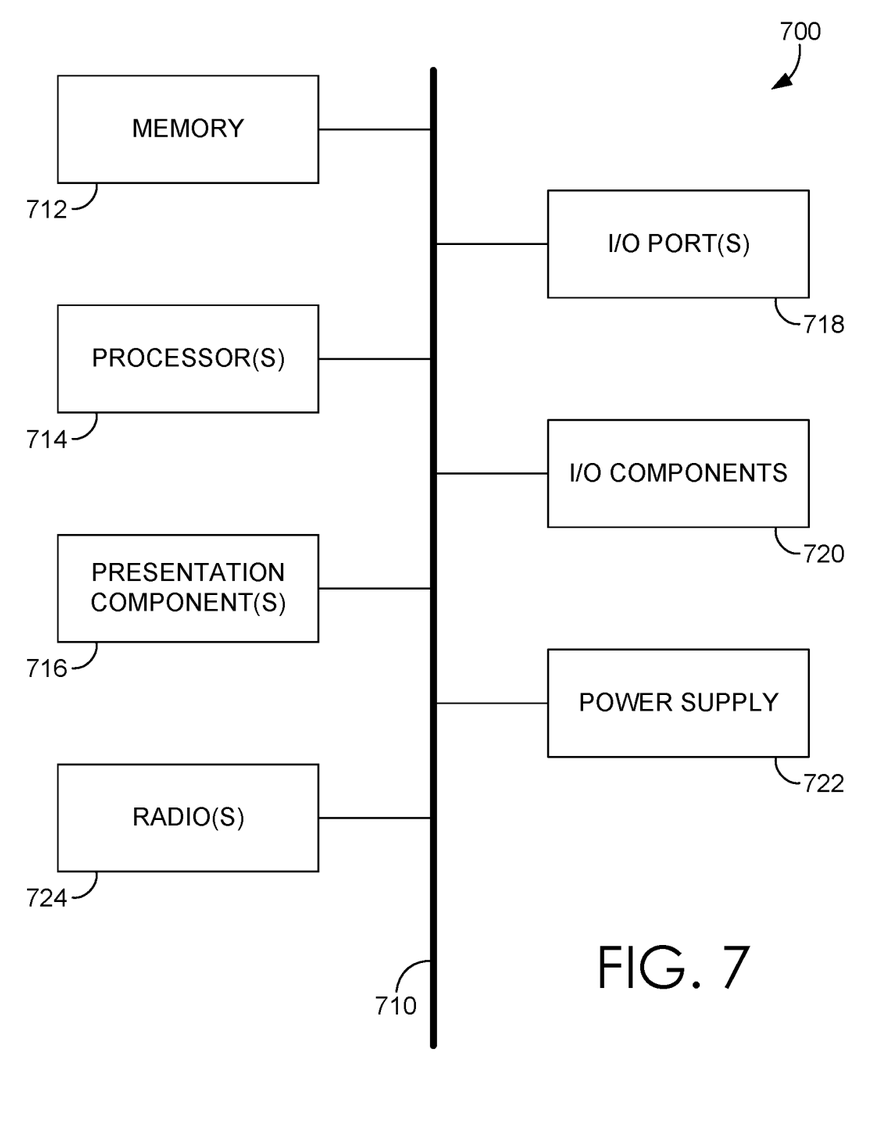
FIG. 7 illustrates an example user device, in accordance with aspects described herein.

User devices associated with or configured to run the carbon dioxide management system 110, such as user device 700 of FIG. 7 for example, is a device that is suitable for collecting information from the user. By way of example and not limitation, user device may be embodied as a personal computer, a laptop computer, a mobile device, a smartphone, a tablet computer, a smart watch, a wearable computer, a fitness tracker, a virtual reality headset, augmented reality glasses, a personal digital assistant, an MP3 player, a global positioning system (GPS) or device, a digital camera, a video player, a handheld communications device, a gaming device or system, an entertainment system, a vehicle computer system, an embedded system controller, a remote control, an appliance, a consumer electronic device, a workstation, another type of suitable device, or one or more combinations of these delineated devices, whether integrated or distributed. In some cases, user device may include devices such as smart mailboxes; smart home appliances; such as a smart refrigerator; smart thermostat; personal assistant, such as Amazon Echo or Google Home; or other smart systems that are capable of providing information to a user and collecting information from a user. In some cases, a user (e.g., human or robotic device user) may interact with the user device by running apps, such as computer software applications stored locally or accessed from a distributed data store. In some cases, apps may access information about the user through other apps or services operating on the user device or operating in the cloud and associated with user device. For example, in some embodiments a user may provide permission for a user-side logistics app to access other apps that the user may utilize, such as a calendar app, a contacts app, a location app or service, a communications app or service such as email or instant messaging, which may include accessing a user's email account with permission, a gaming app, a microphone app, and so on, in order to access and receive information about the user. In this way, additional information about a user may be received by accessing apps and services on one or more user devices utilized by the user.

Figure 2:
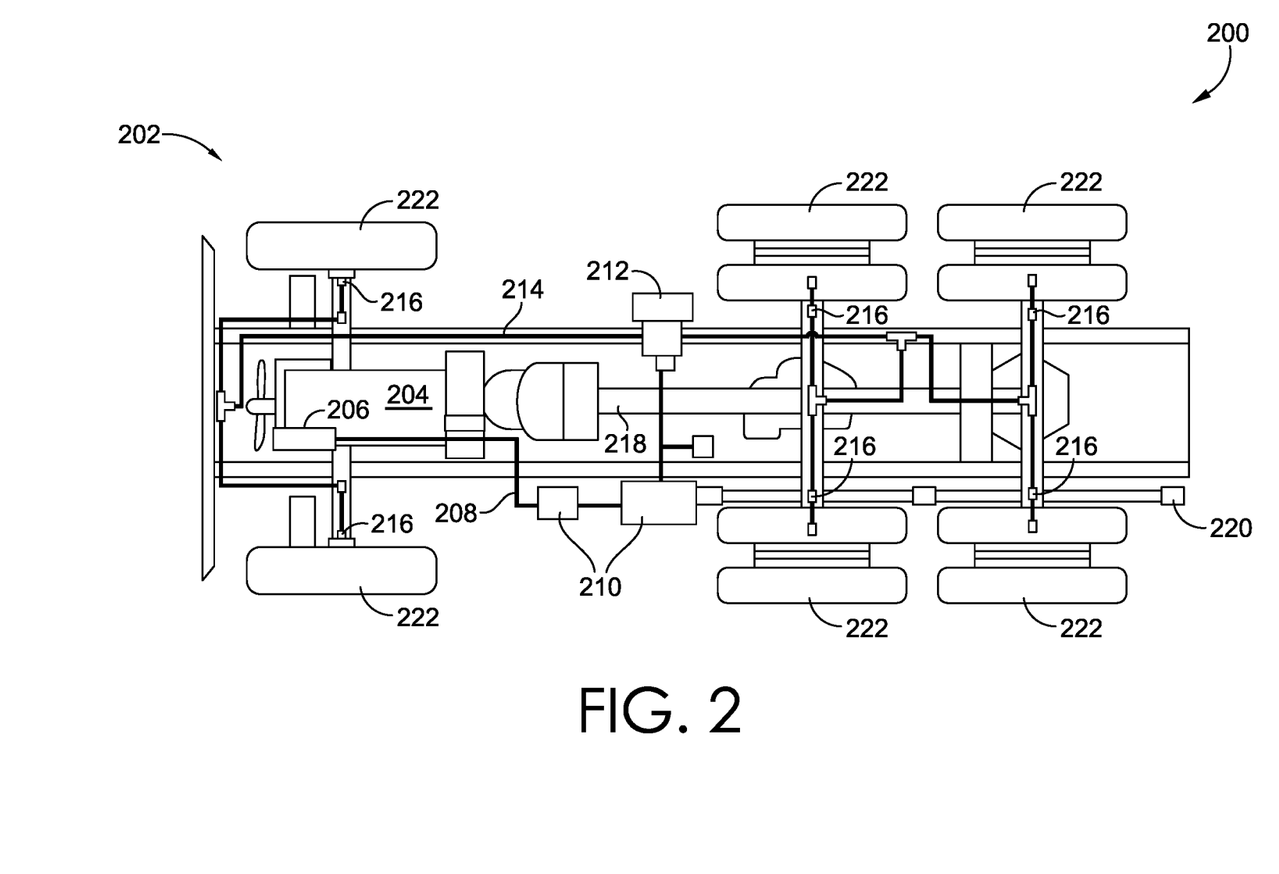
FIG. 2 is an example environment for the capture and storage of carbon dioxide within a vehicle, in accordance with aspects described herein.

Vehicle 102 can be comprised of any vehicle with one or more carbon dioxide producing engines or methods. For example, vehicle 102 can be a semi-truck which drive train is powered by a diesel engine or any other fuel burning engine. The diesel engine generates carbon dioxide gasses when operating and an exhaust system, shown with in FIG. 2, provides an exit for those gases in a desired location. The vehicle 102 may be any vehicle such as a passenger car, delivery van, delivery truck, delivery van, passenger truck, semi-truck, air craft, fuel powered air conditioned trailer, or any other vehicle that has need for a carbon dioxide generated engine or motor. The exhaust from the engine, shown in FIG. 2, is passed to the carbon dioxide capture system 106.

Carbon dioxide capture system 106 operates to remove carbon dioxide from the exhaust gases passed to it from the engine. The carbon dioxide capture system 106 comprises components and systems that allow for the selective removal of carbon dioxide from the exhaust gases and direct them to one or more transfer lines 108 and one of several storage components. The carbon dioxide capture system operates by numerous methods which are beyond the scope of this invention. To be complete though, carbon dioxide is selectively removed from the exhaust gasses through numerous means and methods. Some exemplary and non-limiting methods may be liquid solvents, absorption-based method, scrubbing technology, or any other means or method for capturing carbon dioxide from a mixture of gasses. The carbon dioxide capture system 106 may be attached to the frame of the vehicle 102 or any other rigid structure associated with the vehicle 102.

The captured carbon dioxide from the carbon dioxide capture system 106 is then transferred to the carbon dioxide management system 110 to be distributed to one or more of the storage systems associated with the vehicle. The carbon dioxide management system 110 is able to determine an available storage location for the carbon dioxide. For example, the carbon dioxide management system 110 is able to determine if storage tank 104 or any one of tires 114 have capacity to receive the carbon dioxide. If no capacity is available, the carbon dioxide management system may turn the carbon dioxide capture system 106 off and allow the exhaust gasses to exit the system without removal of any carbon dioxide. Additionally, carbon dioxide management system 110 is able to prioritize storage locations. For example, if the carbon dioxide management system 110 has instructions to deposit carbon dioxide within the one or more tires 114 before the storage tank 104, it is able to ensure that the carbon dioxide is transferred to that location first. Additionally, the carbon dioxide management system 110 has therein a compressor to compress the carbon dioxide to a desired pressure. The incoming carbon dioxide from the carbon dioxide capture system 106 is at a first pressure and may need to be at a second pressure.

The compressor found within the carbon dioxide management system 110 is able to compress the carbon dioxide from the first pressure to the second pressure based on the desired storage location's pressure needs. Storage tank 104 may have a pressure capacity of 860 psi or higher. The one or more tires 114 may only be able to have tire pressure requirements of 120 psi or lower. As such, the carbon dioxide management system 110 is able to manage the pressure based on the storage location. Additionally, the carbon dioxide management system is able to operate valves 116 to determine where the compressed carbon dioxide is directed to. Valve 116 may be part of a series of valves which are operated using the carbon dioxide management system. For example, one valve may be opened such that the carbon dioxide is directed to the storage tank 104. In another example, a valve 116 may be closed and a second valve 116 may be opened to allow the compressed carbon dioxide to fill the one or more tires 116. The compressed carbon dioxide is passed from the carbon dioxide management system 110 to the storage location by way of compressed gas transfer lines 112 that are able to withstand pressures up to the compressed gas pressure.

The vehicle environment 100 may have one or more storage systems. A first storage system is a storage compartment such as storage tank 104. Storage tank 104 in one example is capable of housing carbon dioxide in the gaseous form. In another example, the storage tank 104 is capable of housing liquid carbon dioxide. The compressor associated with the carbon dioxide management system 110 is capable of compressing the carbon dioxide to a pressure within a range of 10 psi to 1500 psi or above. Storage tank 104 may be comprised of one or more materials in a variety of shapes. The storage tank 104 may also have an inlet and an outlet for inputting and outputting carbon dioxide gas and removal of the stored gas. In another example, the one or more tires 114 may be used as a storage system. The one or more tires 114 each have systems and components therein to receive carbon dioxide from the carbon dioxide management system 110 and expel air stored within the one or more tires 114. Thus, ensuring that at any given time the fill rate of both the carbon dioxide storage and the air storage are combined to provide the ideal shape to the tire. By inputting carbon dioxide and expelling air, the one or more tires gradually increase in carbon dioxide percentage until the tire is fully inflated using carbon dioxide. Such components and systems associated with the one or more tires are described herein with respect to FIGS. 3-5.

FIG. 2 provides an example vehicle environment 200 for the sequestration and confinement of carbon dioxide from the exhaust of one or more engines such as engine 204. The vehicle environment 200 comprises an engine 204, an exhaust system 206, an exhaust inlet 208, a carbon dioxide capture system 210, a compressor 212, one or more pressure lines 214, carbon dioxide fill systems 216, a drivetrain 218, exhaust exit 220, and a plurality of tires 222. The engine 204 in one embodiment may be a diesel fueled engine that drives drivetrain 218. In other embodiments, the engine 204 comprises a gasoline fueled engine or a natural gas fueled engine. In alternative embodiments, the engine 204 comprises any combustion engine that produces carbon dioxide as a byproduct of the combustion. Such byproduct is expelled from engine 204 following combustion into exhaust outlet 206 and into exhaust system 208. The exhaust system 208 comprises a series of pipes used to direct the exhaust gasses away from the engine to a desired location such as above a cab of a truck or behind and away from a vehicle at an exhaust outlet 220.

The exhaust system 208 is directed into the carbon dioxide capture system 210 before the exhaust exists the exhaust system 208 at exhaust exit 220. The carbon dioxide captures system 210 is similar to the carbon dioxide system 106 described in FIG. 1. The exhaust gasses produced by engine 204 comprise a mixture of many gas types. Carbon dioxide capture system 210 removes the carbon dioxide from the exhaust gasses allowing the remainder to exit the system through the exhaust exit 220. There are numerous technologies that remove carbon dioxide from exhaust gasses any of which may be employed to remove the carbon dioxide from the exhaust. Additional gasses may also be removed such as water vapor, nitrogen oxides, or any other desired gases. The carbon dioxide capture system 210 takes the captured gas and passes it on through a line to the compressor 212.

The compressor 212 may also be associated with a carbon dioxide management system such as carbon dioxide management system 110. The management system and compressor work tandemly to provide sufficiently pressurized gas to the tires 222 or storage tanks. For example, tires 222 may require pressurized air at a pressure of 90 psi and management system and compressor 212 is able to supply that to tires 222 through compression lines 214. The compressor 212 may be any sort of compressor that is able to pressurize the supplied air including carbon dioxide to pressures of 0 to 150 psi. Additionally, the compressor 212 may be able to pressurize the supplied air to pressures of up to 1500 psi. The compressor 212 may be one single compressor 212 or may be a series of compressors.

The pressure lines 214 comprise lines able to withstand air pressures required. Such air pressures may be up to 1500 psi or up to 150 psi. The pressure lines may also have valves that are operated by the carbon dioxide management system 110. These valves in the pressure lines 214 are able to direct the compressed air one tire of the plurality of tires 222. For example, the carbon dioxide management system 110 may determine that the front driver side tire 222 is capable of accepting additional carbon dioxide. As such, a series of valves will be opened or closed such that only the front driver's side tire 222 receives the compressed carbon dioxide or compressed air. The pressure lines are linked to carbon dioxide fill systems 216 at each tire 222. The carbon dioxide fill systems 216 are designed such that carbon dioxide fills a compartment within the tire 222 and air existing within a second compartment exits. This is done while maintaining a desired tire pressure. Carbon dioxide fill system 216 is described in more detail in FIGS. 4 and 5.

Figure 3:
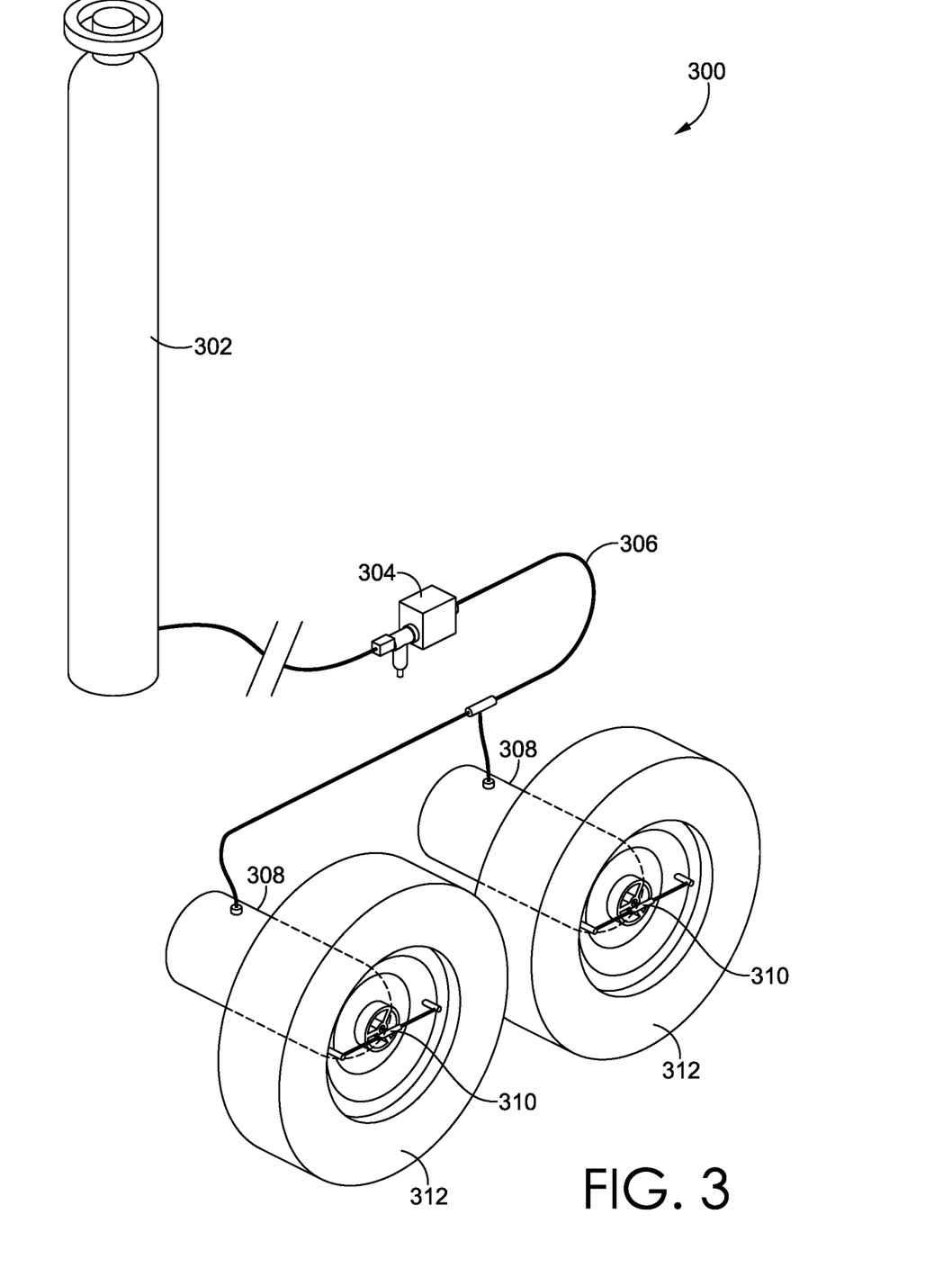
FIG. 3 is an example environment for the capture and storage of carbon dioxide within a vehicle, in accordance with aspects described herein.

FIG. 3 provides another example environment 300 of a carbon dioxide supply system that facilitates the removal of carbon dioxide from vehicle exhaust and stores the carbon dioxide with within tires 312. The example environment 300 comprises a carbon dioxide removal system 302, a carbon dioxide management system 304, pressure lines 306, axels 308, carbon dioxide supply systems 310, and tires 312. Example systems described herein with respect to example environment 300 are similar to portions described above in FIG. 2 and FIG. 1.

In example environment 300, the carbon dioxide management system 304 incorporates a compressor, one or more computer components such as components for user device described in FIG. 7. The carbon dioxide management system 304 is able to receive instructions and setting for several portions of the environment 300. For example, instructions may be received that instruct the carbon dioxide management system 304 to distribute the captured carbon dioxide to the tires at a particular pressure (e.g., 90 psi). Alternatively, the settings or instructions may be modified such that a first tire is filled. Once the first tire is filled a second tire is filled until all of the tires associated with the vehicle and/or trailer are filled. The order of filling may be specified in the settings or instructions. Other settings or instructions may be received by the carbon dioxide management system 304. The carbon dioxide management system 304 may be communicatively coupled to sensors, valves, and switches within the example environment to detect pressures of volumes, turn valves on or off, initiate compression, increase pressure settings, detect flow, detect leaks, or any other system required activities or sensed requirements.

In example environment 300, the pressure lines 306 are attached to an axel 308 by way of a pressure protection valve or other valve. The pressure lines may also be attached to the axel by way of a petcock of other attachment mechanism. The pressure lines 306 may also bypass any axels and directly connect to the tires, wheel hub assemblies, or wheel rims. The pressure lines 306 are connected to the carbon dioxide supply system 310, which is described in more detail in FIG. 5. The carbon dioxide supply system 310 is able to supply a first chamber within tire 312 with pressurized carbon dioxide and remove air within a second chamber within tire 312.

Figure 4:
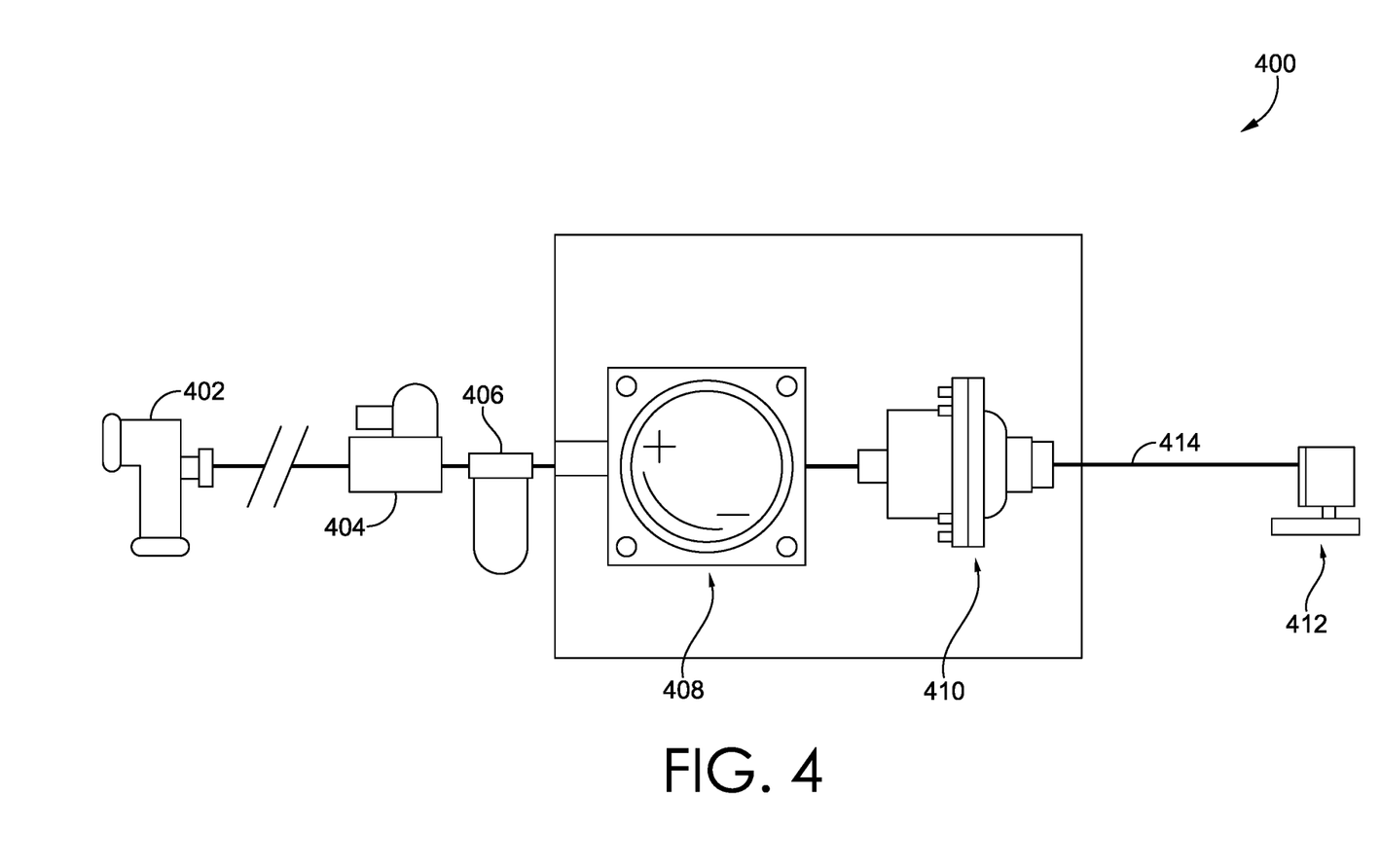
FIG. 4 is an example environment for the capture and storage of carbon dioxide within a vehicle, in accordance with aspects described herein.

FIG. 4 depicts example environment 400 of a portion of a carbon dioxide management system for the compression and storage of carbon dioxide. The carbon dioxide management system comprises a pressure valve 402, a shut-off valve 404, a filter 406, a compressor 408, a flow sensor 410, pressure lines 414, and a petcock 412. Each of the valves or sensors described with respect to FIG. 4 may be communicatively coupled with a device such as user device described in FIG. 7. Each of the components may be controlled using one or more processors configured to operate within particular specifications.

In some embodiments, pressure valve 402 and the shut-off valve 404 operate to restrict or allow a particular pressure of carbon dioxide into the compressor 408. The pressure valve 402 may protect the entire system from over-pressurization and only allow pressures below a threshold into the compressor. The pressure valve 402 may be adjusted manually or by way of a remote operating system. Each of the components may be wirelessly connected to the remote operating system. Additionally, the shut-off valve 404 operates as an on or off valve to either allow the flow of carbon dioxide from the carbon dioxide removal system to any of the tires or storage tanks found within a vehicle. Filter 406 may be used to filter out excess water or other contaminants within the input un-compressed air.

Following the filter, the carbon dioxide enters compressor 408. The compressor may be operated manually using a pressure knob to increase or decrease the desired output pressure. Additionally, the compressor may be communicatively coupled to a remote operating system such as a user device of FIG. 7. The user device may send instructions to compressor 408 to pressurize the incoming carbon dioxide to a set pressure. The compressor may operate variably as well based on the storage location. As an example, if the storage location is a tire on the semi-truck, the compressor 408 may pressurize the carbon dioxide to 90 psi. However, if the tire is found on a trailer, the compressor 408 may pressurized the carbon dioxide to, for example 110 psi. The flow switch 410 operates to determine where the flow of pressurized carbon dioxide will go. The flow switch 410 is operated in one example by the remote user device which monitors the capacity of each storage location. The user device will instruct the flow switch 410 or system of switches to turn on or off to direct the flow of pressurized carbon dioxide from the compressor 408 through pressure line 414 to petcock 412. Petcock 412 connects the pressure line 414 to the desired storage location.

Figure 5:
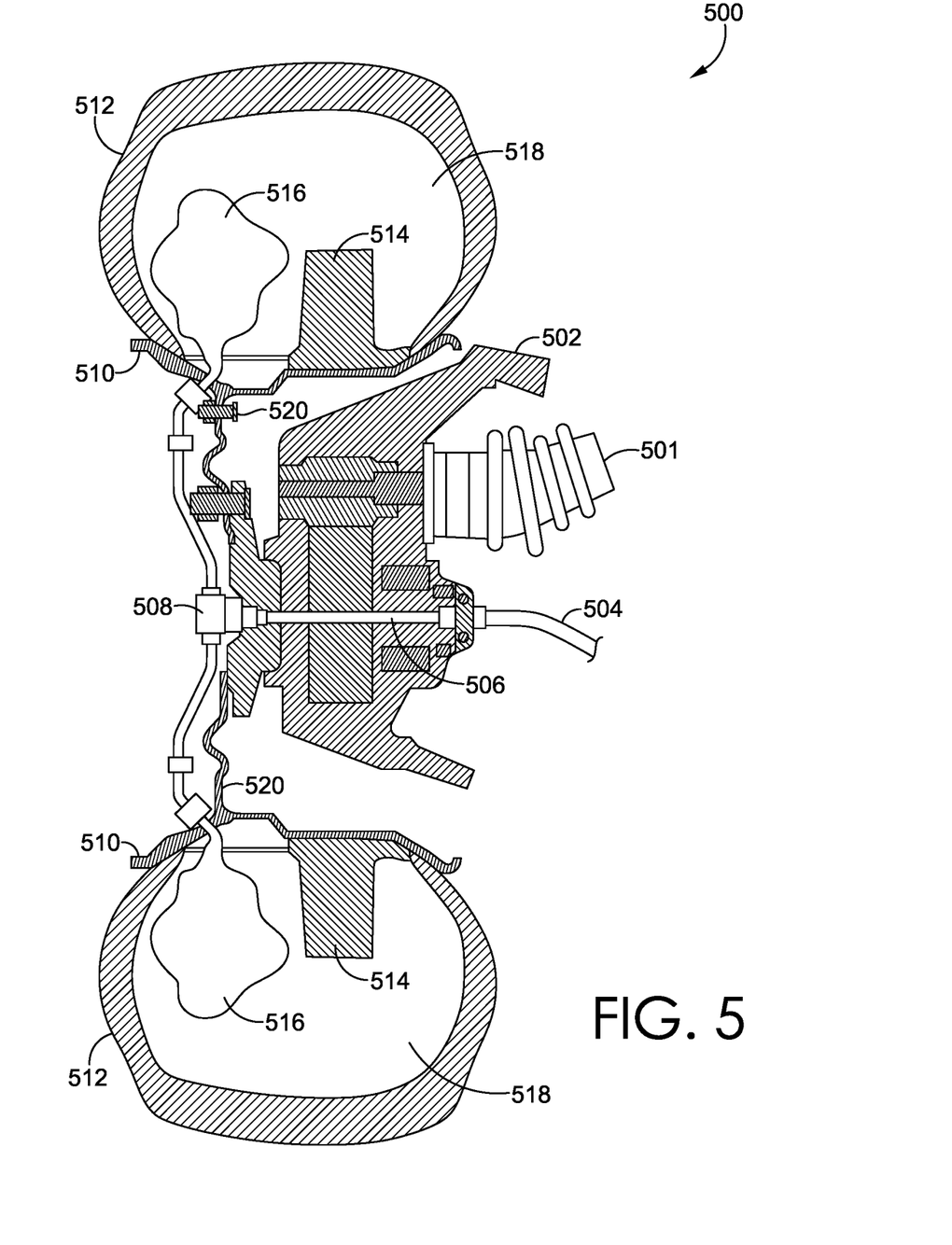
FIG. 5 is an example environment for the capture and storage of carbon dioxide within a vehicle's tire, in accordance with aspects described herein.

FIG. 5 illustrates an example carbon dioxide supply environment 500 for supply of carbon dioxide into a tire 512 and extraction of air out of the tire 512. The carbon dioxide supply environment 500 comprises a drive shaft component 501, a hub assembly 502, a supply line 504, a spindle air passage 506, an inlet line system 508, a wheel assembly 510, a tire 512, a run flat system 514, a first chamber 516, a second chamber 518, and an air fill system 520. The drive shaft component 501 and the hub assembly work in tandem to provide rotational energy to the wheel 510 and tire 512. However, other exemplary systems do not have a drive shaft and simply rotate with movement of the vehicle. For example, some wheel systems are drive wheels whereas others are non-powered wheels and do not require driveshaft components by may be attached to an axel such as a solid axel.

In some embodiments, the supply line 504 receives compressed carbon dioxide from the compressor as described in prior figures. Compressor compresses captured carbon dioxide and delivers it to the supply line 504. The supply line connects to the spindle air passage 506. Spindle air passage 506 operates using air passage bearings and allows air to pass from one side of the wheel hub assembly 502 to the other without loss of carbon dioxide. This is especially important as the wheel 510 and hub assembly 502 spin freely of each other and normal air passage would not operate without significant loss of pressure. The compressed carbon dioxide passes through the spindle air passage 506 to the carbon dioxide line system 508.

In some embodiments, the carbon dioxide line system 508 splits the carbon dioxide that is coming from the spindle air passage 506 into two, to inflate the first compartment from two locations. In other embodiments, the carbon dioxide line system 508 takes the carbon dioxide from the spindle air passage 506 to the first compartment through a single line. At the end of the carbon dioxide line system 508, a valve is placed so carbon dioxide can be directed into the first compartment 516. In another embodiment, the carbon dioxide may be extracted from the first compartment 516 through the carbon dioxide line system 508.

In one example, the first chamber 516 is a fillable airtight container connected to the carbon dioxide air system 508. The carbon dioxide air system 508 provides compressed carbon dioxide to the first chamber 516. As the compressed carbon dioxide fills the first chamber, the tire fills beyond the desired pressure. As such, pressure is released from the second chamber through the air fill system 520. The air fill system may comprise a pressure release valve that releases air when the second chamber 518 exceeds a threshold pressure. The air fill system 520 may also comprise a petcock that allows a user to input compressed air into the second chamber 518 and expel the carbon dioxide within the first chamber 516. For example, while driving, the carbon dioxide removal system removes air from the exhaust of the vehicle. The carbon dioxide is then compressed and sent through the spindle air passage 506 and the carbon dioxide line system 508 to the first chamber 516. As an example, when a vehicle starts a trip, the second chamber 518 is filled to the desired pressure with external air and the first chamber 516 is empty. When the engine runs the first chamber 516 begins to fill with carbon dioxide. The pressure of the tire 512 increases and once the pressure of the tire 512 exceeds a threshold, the air filling the second chamber 518 is released through the air fill system 520. Once the first chamber 516 is filled, the compressed carbon dioxide is diverted at the carbon dioxide management system 110 to another tire or storage location.

At a deposit location, the carbon dioxide filling the first chamber 516 is removed through the carbon dioxide line system 518 and placed into an external storage container. External air is also placed into the second chamber 518 such that the pressure in the tire remains at a desired level. The external air may be supplied using an external or on board air compressor.

The first chamber 516 comprises a fillable container that is isolated pressure wise from the second chamber. The first chamber may be made up of a material that is expandable such as an inner tube or some other chamber that is able to hold the pressure. The second chamber 518 may be made up of the same chamber material as the first chamber 516. The second chamber may also be the space within the tire 512 that is not the first chamber 516. Each of the chamber also may contain pressure sensors and methods of measuring the volume remaining. For example, a flow valve may be placed in the carbon dioxide line system to measure the amount of carbon dioxide input into the first chamber. Based on the volume of the tire and a threshold pressure, the maximum amount of carbon dioxide can be determined. As such, the volume input into the first chamber can be measured and a shut off valve can be used to stop the flow into that tire 512 when the maximum amount of carbon dioxide is provided.

Figure 6:
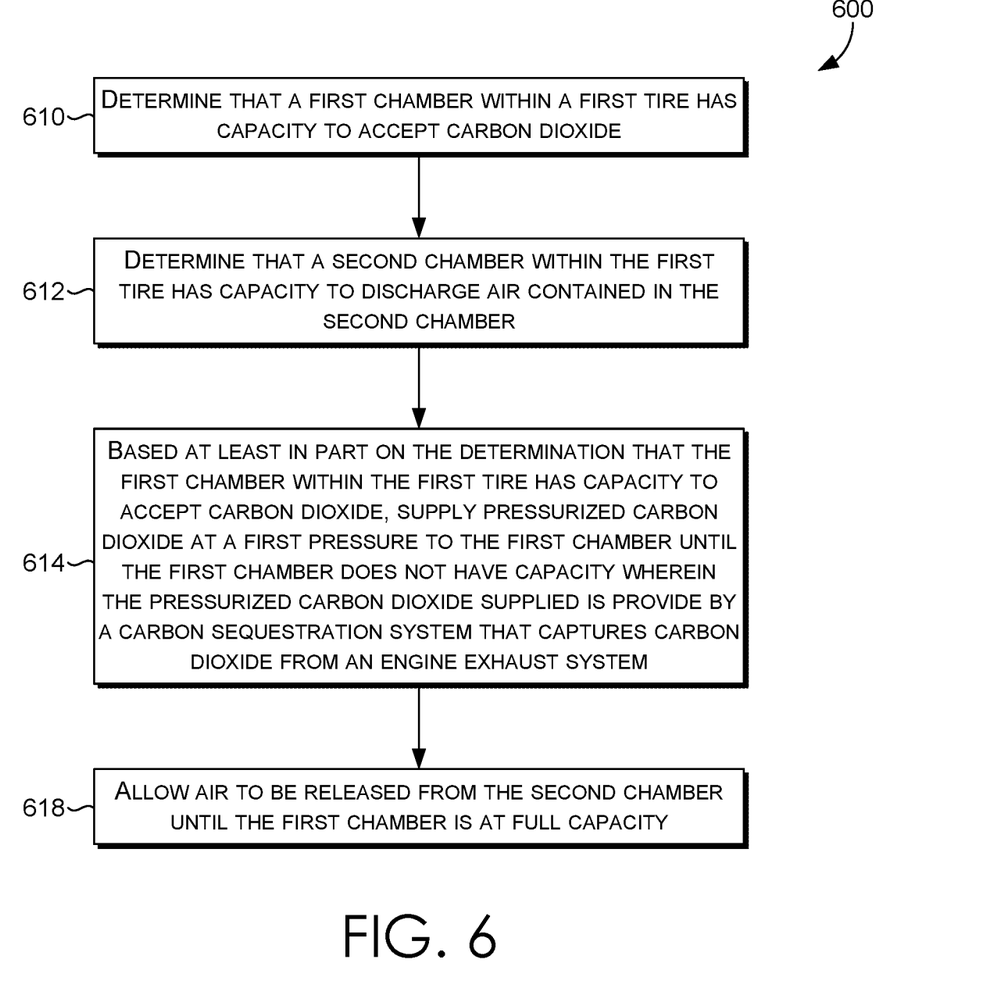
FIG. 6 illustrates an example flowchart for storing captured carbon dioxide within a vehicle's tire, in accordance with aspects described herein.

FIG. 6 provides an example flowchart 600 for delivering pressurized carbon dioxide from a carbon dioxide sequestration system to a tire onboard a vehicle. In some embodiments. At 610 first chamber (such as first chamber 516) within a first tire is determined to have capacity to accept carbon dioxide. At 612, a second chamber (such as second chamber 518) within the first tire is determined to have capacity to discharge air contained in the second chamber. At step 614 based at least in part on the determination that the first chamber within the first tire has capacity to accept carbon dioxide, supply pressurized carbon dioxide at a first pressure to the first chamber until the first chamber does not have capacity wherein the pressurized carbon dioxide supplied is provide by a carbon sequestration system that captures carbon dioxide from an engine exhaust system. The supplied pressurized carbon dioxide is extracted from an exhaust system attached to a combustion engine. At step 616, air that is pressurizing the second chamber is allowed to be released from the second chamber until the first chamber is at full capacity.

Having described the example embodiments discussed above of the presently disclosed technology, an example operating environment of an example device is described below with respect to FIG. 7. User device 700 is but one example of a suitable computing environment, and is not intended to suggest any particular limitation as to the scope of use or functionality of the technology disclosed. Neither should user device 700 be interpreted as having any dependency or requirement relating to any particular component illustrated, or a particular combination of the components illustrated in FIG. 7.

As illustrated in FIG. 7, example user device 700 includes a bus 702 that directly or indirectly couples the following devices: memory 704, one or more processors 706, one or more presentation components 708, one or more input/output (I/O) ports 710, one or more I/O components 712, a power supply 714, and one or more radios 716.

Bus 702 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component, such as a display device, to be an I/O component. Also, processors have memory. Accordingly, FIG. 7 is merely illustrative of an exemplary user device that can be used in connection with one or more embodiments of the technology disclosed herein.

User device 700 can include a variety of computer-readable media. Computer-readable media can be any available media that can be accessed by user device 700 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 704 includes computer storage media in the form of volatile and/or nonvolatile memory. The memory 704 may be removable, non-removable, or a combination thereof. Example hardware devices of memory 704 may include solid-state memory, hard drives, optical-disc drives, other hardware, or one or more combinations thereof. As indicated above, the computer storage media of the memory 704 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 700, or one or more combinations thereof.

The one or more processors 706 of user device 700 can read data from various entities, such as the memory 704 or the I/O component(s) 712. The one or more processors 706 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 706 can execute instructions, for example, of an operating system of the user device 700 or of one or more suitable applications.

The one or more presentation components 708 can present data indications via user device 700, another user device, or a combination thereof. Example presentation components 708 may include a display device, speaker, printing component, vibrating component, another type of presentation component, or one or more combinations thereof. In some embodiments, the one or more presentation components 708 may comprise one or more applications or services on a user device, across a plurality of user devices, or in the cloud. The one or more presentation components 708 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof. For example, the one or more presentation components 708 can present a visualization that compares a plurality of inspections of one or more cores of a central processing unit and a visualization of each task of each of the plurality of inspections.

The one or more I/O ports 710 allow user device 700 to be logically coupled to other devices, including the one or more I/O components 712, some of which may be built in. Example I/O components 712 can include a microphone, joystick, game pad, satellite dish, scanner, printer, wireless device, and the like. The one or more I/O components 712 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 708 on the user device 700. In some embodiments, the user device 700 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 700 may, additionally or alternatively, be equipped with accelerometers or gyroscopes that enable detection of motion. In some embodiments, the output of the accelerometers or gyroscopes may be provided to the one or more presentation components 708 of the user device 700 to render immersive augmented reality or virtual reality.

The power supply 714 of user device 700 may be implemented as one or more batteries or another power source for providing power to components of the user device 700. In embodiments, the power supply 714 can include an external power supply, such as an AC adapter or a powered docking cradle that supplements or recharges the one or more batteries. In aspects, the external power supply can override one or more batteries or another type of power source located within the user device 700.

Some embodiments of user device 700 may include one or more radios 716 (or similar wireless communication components). The one or more radios 716 can transmit, receive, or both transmit and receive signals for wireless communications. In embodiments, the user device 700 may be a wireless terminal adapted to receive communications and media over various wireless networks. User device 700 may communicate using the one or more radios 716 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 716 may facilitate communication via radio frequency signals, frames, blocks, transmission streams, packets, messages, data items, data, another type of wireless communication, or one or more combinations thereof. The one or more radios 716 may be capable of transmitting, receiving, or both transmitting and receiving wireless communications via mmWaves, FD-MIMO, massive MIMO, 3G, 4G, 5G, 6G, another type of Generation, 802.11 protocols and techniques, another type of wireless communication, or one or more combinations thereof.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims. The described technology may be made without departing from the scope, it is to be understood that all matter described herein or illustrated in the accompanying drawings is to be interpreted as illustrative and not in a limiting sense.

What is claimed is:

1. A system onboard a vehicle to facilitate storage of carbon dioxide extracted from the vehicle in transit, the system comprising:
 a wheel assembly coupled to a tire, wherein the wheel assembly comprises a first compartment and the wheel assembly coupled to the tire forms a second compartment; and
 a hub assembly configured to provide rotational energy to the wheel assembly, wherein the hub assembly comprises (1) a supply line configured to receive the carbon dioxide and (2) a spindle air passage coupled to the supply line, the spindle air passage comprises air passage bearings to allow the carbon dioxide to pass from a first side of the hub assembly to a second side of the hub assembly to an inlet line system to inflate the first compartment with the carbon dioxide, the second compartment comprises a volume of air, and the second compartment is coupled to a pressure release value configured to release air from the second compartment when the second compartment satisfies a threshold pressure.

2. The system of claim 1, wherein the carbon dioxide is captured from an exhaust gas emitted from an engine associated with the vehicle.

3. The system of claim 1, further comprising a carbon dioxide compressor, wherein the carbon dioxide compressor is operated using one or more processors.

4. The system of claim 3, wherein the one or more processors are linked to one or more sensors that detect pressure and flow to the first compartment from the carbon dioxide compressor.

5. The system of claim 4, wherein the one or more processors are configured to determine, using a detected flow and a detected pressure, a volume within the first compartment is below a threshold.

6. The system of claim 5, wherein the one or more processors are configured to turn the carbon dioxide compressor on based on determining that the volume is below the threshold.

7. The system of claim 1, wherein the tire has a first pressure and a first volume, the first volume being a combination of a first compartment volume and a second compartment volume.

8. A method comprising:
  determining that a first chamber of a wheel assembly coupled to a tire has a first capacity to accept carbon dioxide;
  determining that a second chamber formed from the wheel assembly coupled to the tire has a second capacity to discharge air contained in the second chamber;
  based at least in part on determining that the first chamber has the first capacity to accept the carbon dioxide, supplying the carbon dioxide at a first pressure to the first chamber via a hub assembly comprising (1) a supply line configured to receive the carbon dioxide and (2) a spindle air passage coupled to the supply line, wherein the spindle air passage comprises air passage bearings to allow the carbon dioxide to pass from a first side of the hub assembly to a second side of the hub assembly to an inlet line system to inflate the first chamber with the carbon dioxide until the first chamber does not have the first capacity; and
  allowing the air contained within the second chamber to be released until the first chamber is at a full capacity.

9. The method of claim 8, wherein the first chamber is determined to have the first capacity based at least in part an available volume of the first chamber.

10. The method of claim 9, wherein the first chamber is further determined to have the first capacity based in part on a measured flow and a measured pressure of the carbon dioxide within the first chamber.

11. The method of claim 10, wherein the measured flow is determined by a flow valve located between a compressor and the tire.

12. The method of claim 8, wherein the carbon dioxide is provided by a carbon sequestration system that captures the carbon dioxide from an engine exhaust system.

13. The method of claim 8, further comprising: removing the carbon dioxide from the first chamber by pressurizing the second chamber and opening a release valve connected to the first chamber.

14. The method of claim 8, wherein the tire has and a first volume, the first volume being a combination of a first chamber volume and a second chamber volume.

15. One or more non-transitory computer storage media having computer-executable instructions embodied thereon, that when executed by at least one processor, cause the at least one processor to perform operations comprising:
  determining that a first chamber of a wheel assembly coupled to a tire has a first capacity to accept carbon dioxide;
  determining that a second chamber formed from the wheel assembly coupled to the tire has a second capacity to discharge air contained in the second chamber;
  based at least in part on determining that the first chamber has the first capacity to accept the carbon dioxide, supplying the carbon dioxide at a first pressure to the first chamber via a hub assembly comprising (1) a supply line configured to receive the carbon dioxide and (2) a spindle air passage coupled to the supply line, wherein the spindle air passage comprises air passage bearings to allow the carbon dioxide to pass from a first side of the hub assembly to a second side of the hub assembly to an inlet line system to inflate the first chamber with the carbon dioxide until the first chamber does not have the first capacity, wherein the carbon dioxide is provided by a carbon sequestration system that captures the carbon dioxide from an engine exhaust system; and
  allowing the air contained within the second chamber to be released until the first chamber is at a full capacity.

16. The one or more non-transitory computer storage media of claim 15, wherein the first chamber is determined to have the first capacity based at least in part an available volume of the first chamber.

17. The one or more non-transitory computer storage media of claim 16, wherein the first chamber is further determined to have the first capacity based in part on a measured flow and a measured pressure of the carbon dioxide within the first chamber.

18. The one or more non-transitory computer storage media of claim 17, wherein the measured flow is determined by a flow valve located between a compressor and the tire.

19. The one or more non-transitory computer storage media of claim 15, further comprising: removing the carbon dioxide from the first chamber by pressurizing the second chamber and opening a release valve connected to the first chamber.

* * * * *